Dec. 17, 1935.  S. A. STAEGE  2,024,708
ELECTRON TUBE TYPE TENSION REGULATOR
Filed May 20, 1932
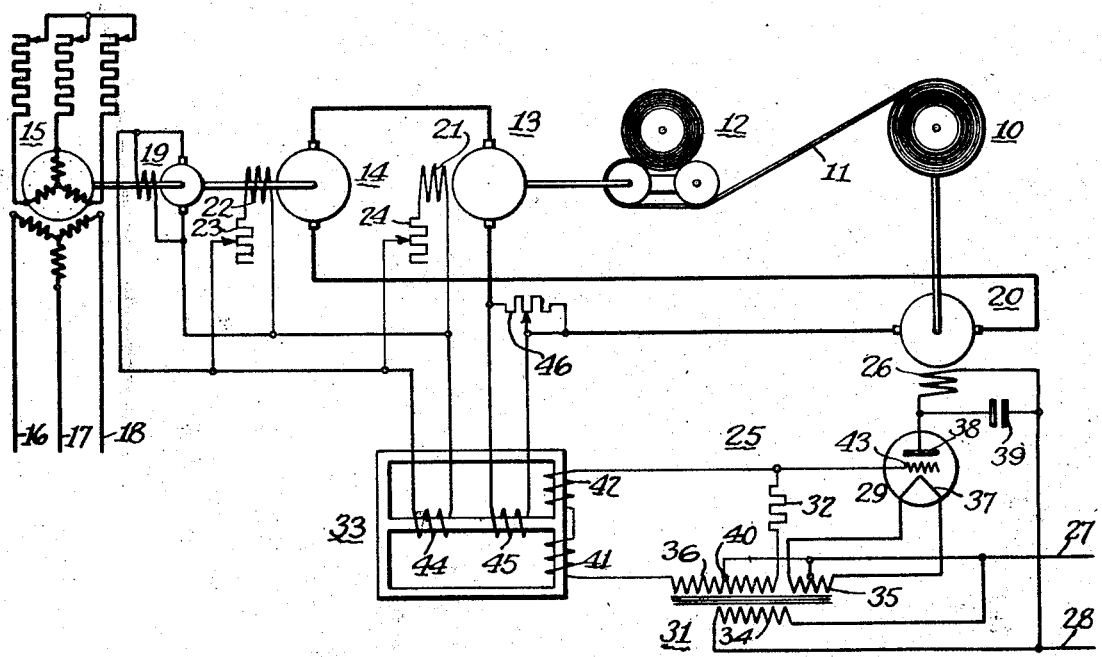
WITNESSES:
B. A. McCloskey.
P. E. Friedemann
INVENTOR
Stephen A. Staege.
BY W. R. Coley
ATTORNEY Patented Dec. 17, 1935

2,024,708

UNITED STATES PATENT OFFICE 2,024,708

ELECTRON TUBE TYPE TENSION REGULATOR

Stephen A. Staege, Pittsburgh, Pa., assignor to Westinghouse Electric & Manufacturing Company, East Pittsburgh, Pa., a corporation of Pennsylvania Application May 20, 1932, Serial No. 612,456

7 Claims. (Cl. 242—75)

My invention relates, generally, to electric control systems, and more particularly to a system for automatically controlling the operation of a generator employed as a brake for an unwinding reel, or the like, for strip material.

The object of my invention, generally stated, is to maintain a substantially constant tension on strip material extending between a plurality of work devices.

A more specific object of my invention is to provide for controlling the operation of an electrically-braked unwinding reel to maintain a substantially constant tension on the material being unwound therefrom regardless of the speed or diameter of the reel.

Another object of my invention is to provide for utilizing a thermionic device for controlling the operation of a generator employed as a brake for unwinding reels and the like.

A further object of my invention is to provide for exciting a direct-current braking generator from an alternating-current source and controlling the excitation in accordance with the generator load current by means of a thermionic regulating device.

A still further object of my invention is to provide for utilizing a thermionic regulating device for controlling the excitation of a direct-current generator employed as a brake for an unwinding reel in accordance with the generator load current to subject the unwinding material to a substantially constant tension.

In accordance with one form of the invention, the braking generator for the unwinding reel is supplied with power from a variable-voltage generator which also supplies power to the driving motor of the winding reel. The braking generator is supplied with unidirectional excitation current from an alternating-current source through a thermionic rectifier which is controlled by a phase shift circuit or device which, in turn, is controlled in accordance with the load current of the braking generator to subject the material to a substantially constant tension.

In order to obtain a more comprehensive understanding of the nature and operation of the invention, reference may be had to the following description and the accompanying drawing, in which the single figure is a diagrammatic illustration of a system embodying the principal features of the invention.

Referring now to the drawing, 10 designates an unwinding reel containing a quantity of strip material 11 which is to be wound upon a winding reel 12. The winding reel 12 may be driven by a direct-current motor 13 which is supplied with variable-voltage power from a direct-current generator 14 driven by a suitable motor 15 connected to a source of power indicated by line conductors 16, 17 and 18. An exciter 19 also driven by the motor 15 is provided for energizing the field windings 21 and 22 of the motor 13 and generator 14, respectively, and other apparatus to be described hereinafter. Rheostats 23 and 24 are provided for varying the excitation of the generator 14 to vary the speed of the winder motor 13 and to vary the excitation of the winder motor 13.

The unwinding reel 10 is controlled in this instance by a braking generator 20 having its armature connected in series circuit relation with the armature of the winder motor 13 and the generator 14.

It is apparent that, in the operation of a machine of this kind, there are changing conditions resulting from variations in speed of the winder motor 13 and variations in the amount of material, and consequently, the diameter of the unwinding reel 10. In order to maintain the material under a substantially constant tension at all times regardless of speed variations and varying reel diameter, it is necessary to maintain the load current of the braking generator 20 at a substantially constant value.

With a view to maintaining a substantial constant load current on the braking generator 20, there is provided a regulator device 25 which is disposed to supply unidirectional current to the field winding 26 of the braking generator 20 from the constant voltage and frequency source, represented by conductors 27 and 28, in accordance with the armature or load current of the braking generator.

In this instance, the regulator 25 comprises generally a grid-controlled thermionic device or tube 29 which is utilized as a rectifier and a phase-shift circuit comprising the transformer 31, resistor 32 and three-legged reactor 33.

The transformer 31 is provided with a primary winding 34 connected to the alternating-current source 27—28 and secondary windings 35 and 36. Secondary winding 35 is connected to the cathode 37 of the tube 29, while the other secondary winding 36 constitutes a portion of the phase-shift circuit.

As shown, the field winding 26 of the braking generator is connected across the alternating-current source 27—28 through the anode 38 and cathode 37 of the tube in order that the degree of excitation of the generator may be controlled by the tube. A capacitor 39 is connected across the field winding 26 in order to smooth out the ripples of the pulsating unidirectional current supplied by the tube 29.

The operation of the control tube 29 is, in this embodiment of the invention, controlled by the phase-shift circuit, which functions to vary the phase relationship between the grid voltage and the anode-cathode voltage of the tube, and consequently, the amount of current passed by the tube. The secondary winding 36 of the transformer 31 is provided with a middle tap 40 connected to the conductor 27 of the alternating-current source and is connected in series with the resistance 32 and the windings 41 and 42 on the outer legs of the reactor 33. This arrangement, which constitutes the phase-shift circuit, is connected to the grid 43 of the tube 29 and is effective to control the amount of current passed by the tube in a well known manner.

In order to cause the phase-shift circuit to function in accordance with the load of the braking generator, the reactor 33 is provided on the middle leg thereof with direct-current saturating windings 44 and 45, which function to vary the saturation of the reactor core and thereby vary the inductance of the phase-shift circuit.

The saturating winding 44 is connected across the exciter 19 in order to partially saturate the core. The other saturating winding 45 is energized in proportion to the load of the braking generator 20 by connecting it across an adjustable load resistor 46 in the generator circuit, as shown.

It is apparent that the load resistor 46 may be so adjusted as to produce the required degree of saturation of the reactor 33 to maintain the necessary phase relation between the grid voltage and the anode-cathode voltage of the tube 29 to cause the braking generator to maintain the desired amount of tension on the material 11. When the reel 10 is filled with material, its diameter is a maximum and the speed of the braking generator is a minimum. The regulator then functions to hold the load current substantially constant by varying the generator excitation as the reel speed increases. As the diameter of the reel decreases, the speed of the braking generator increases, and the regulator functions to reduce the excitation of the generator accordingly.

Thus it is apparent that the invention provides for maintaining a substantially constant tension on the material 11 by means of a regulator of simple construction which will function effectively and accurately over a wide range of operation, and which does not involve the use of moving elements of any kind.

It may be stated, in conclusion, that, while the illustrated example constitutes a practical embodiment of my invention, I do not wish to limit myself strictly to the exact details herein illustrated, since modifications of the same may be made without departing from the spirit of the invention, as defined in the appended claims.

I claim:

1. The combination with cooperating winding and unwinding reels for sheet material, of a generator for braking the unwinding reel, a motor for driving the winding reel, a source of power, said braking generator and winding motor being connected in series circuit relation to the power source, and means controlled in accordance with the current flowing in the series circuit for controlling the excitation of the braking generator, thereby to provide for automatically maintaining a substantially constant tension on the material.

2. The combination with cooperating winding and unwinding reels for sheet material, of a generator for braking the unwinding reel, a motor for driving the winding reel, a source of power, said braking generator and winding motor being connected in series circuit relation to the power source, thermionic means for controlling the excitation of the braking generator, and means responsive to the current flowing in the series circuit for controlling the operation of said thermionic means, thereby to maintain a substantially constant tension on the strip.

3. The combination with cooperating winding and unwinding reels for sheet material, of a generator for braking the unwinding reel, a motor for driving the winding reel, a source of power, said braking generator and winding motor being connected in series circuit relation to the power source, a source of alternating current, rectifier means disposed to supply uni-directional current to excite the braking generator, and means responsive to the current flowing in the series circuit for controlling the functioning of the rectifier means, thereby to control the generator excitation and consequently maintain the braking tension at a substantially constant value.

4. The combination with winding and unwinding reels for handling strip material, of a direct-current motor for driving the winding reel, a direct-current generator for braking the unwinding reel to tension the material, a direct-current generator connected in series circuit relation with the winding reel motor and braking generator, a source of alternating current, an electric discharge device for supplying uni-directional excitation current to the braking generator, and means including a phase shifting circuit for controlling the functioning of the electric discharge device in accordance with the load current flowing in the series circuit.

5. The combination with winding and unwinding reels for handling strip material, of a direct-current motor for driving the winding reel, a direct-current generator for braking the unwinding reel to tension the material, a direct-current generator connected in series circuit relation with the winding reel motor and braking generator, means including an electric discharge device for controlling the excitation of the braking generator, and reactor means responsive to the load current of the generator for controlling the operation of said last-named means, thereby to automatically maintain the braking torque of the braking generator at a substantially constant value.

6. The combination with winding and unwinding reels for handling strip material, of a direct-current motor for driving the winding reel, a direct-current generator for braking the unwinding reel to tension the material, a direct-current generator connected in series circuit relation with the winding reel motor and braking generator, a source of alternating current, an electric discharge device for supplying uni-directional excitation current to the braking generator, a phase shifting circuit for controlling the functioning of the electric discharge device, and reactor means having windings connected in the phase shifting circuit for controlling the operation of the electric discharge device in accordance with the load current flowing in the series circuit.

7. The combination with winding and unwinding reels for handling strip material, of a generator for braking the unwinding reel, a motor for driving the winding reel, a motor-generator set for supplying power, said winding reel motor and braking generator being connected in series circuit relation with the power generator of the motor-generator set, an exciter for supplying excitation current to the power generator and the winder motor, means including an electric-discharge device and a phase-shifting circuit for controlling the excitation of the braking generator, a reactor provided with control windings constituting a part of the phase-shifting circuit and saturating windings, one of said saturating windings being connected to the exciter and the other connected to the series circuit for energization in accordance with the load current of the braking generator, thereby to maintain a substantially constant tension on the strip material.

STEPHEN A. STAEGE.